(12) United States Patent
Creasey et al.

(10) Patent No.: US 11,669,508 B2
(45) Date of Patent: Jun. 6, 2023

(54) ACTOR-BASED DATA PROCESSING

(71) Applicant: Itron, Inc., Liberty Lake, WA (US)

(72) Inventors: Wayne Creasey, Colbert, WA (US); Thomas Kring, Concord, CA (US)

(73) Assignee: Itron, Inc., Liberty Lake, WA (US)

( * ) Notice: Subject to any disclaimer, the term of this patent is extended or adjusted under 35 U.S.C. 154(b) by 154 days.

(21) Appl. No.: 17/179,315

(22) Filed: Feb. 18, 2021

(65) Prior Publication Data

US 2022/0261390 A1 Aug. 18, 2022

(51) Int. Cl.
*G06F 16/22* (2019.01)
*G06F 16/21* (2019.01)
*H04W 4/38* (2018.01)
*H04W 76/11* (2018.01)

(52) U.S. Cl.
CPC ........ *G06F 16/2282* (2019.01); *G06F 16/211* (2019.01); *G06F 16/217* (2019.01); *H04W 4/38* (2018.02); *H04W 76/11* (2018.02)

(58) Field of Classification Search
CPC .................................................. G06F 16/2282
USPC .......................................................... 707/803
See application file for complete search history.

(56) References Cited

U.S. PATENT DOCUMENTS

| | | | |
|---|---|---|---|
| 2014/0167976 A1* | 6/2014 | Barrett | G01D 4/004 340/870.02 |
| 2016/0364403 A1* | 12/2016 | Branson | G06F 16/24556 |
| 2017/0293273 A1* | 10/2017 | Slupik | H04W 4/33 |
| 2017/0316444 A1* | 11/2017 | Smith | G06F 16/41 |
| 2020/0004510 A1* | 1/2020 | Clebsch | G06F 16/2228 |
| 2021/0365468 A1* | 11/2021 | Ranganathan | G06F 16/254 |
| 2021/0385169 A1* | 12/2021 | Urman | H04L 45/24 |
| 2022/0083566 A1* | 3/2022 | Ben Ze'ev | G06F 16/283 |

* cited by examiner

*Primary Examiner* — Muluemebet Gurmu
(74) *Attorney, Agent, or Firm* — Lee & Hayes, P.C.

(57) ABSTRACT

A system includes a stream partition manager configured to receive data packets input from a plurality of actors, the actors including virtual representations of physical devices, and partition the data packets into a number of stream partitions based at least in part on one or more criteria. The system further includes a plurality of stream processors communicatively coupled to the stream partition manager. Individual stream processors of the plurality of stream processors being configured to receive data packets from a stream partition of the number of stream partitions, process the data packets to generate multiple table entries, and transmit the multiple table entries in batches. The system further includes a target table communicatively coupled to the plurality of stream processors. The target table is configured to receive and store the batches received from the individual stream processors.

19 Claims, 9 Drawing Sheets

ACTOR-BASED DATA PROCESSING

BACKGROUND

Communication networks, such as wireless mesh networks, star networks, and so on, are used to connect a variety of different physical devices. These communication networks may contain physical devices having the same or different characteristics and capabilities. Each physical device may transmit data to a data collection service to allow for data analysis operations to be performed. When large numbers of physical devices are involved, data transmission from the physical devices to the data collection service may result in latency and low throughput of the data to the data collection service. Furthermore, once the data is received by the data collector, the data must be processed and stored. If the data from each physical device were written directly to a persistent store, it would be very inefficient and result in low throughput. This bottleneck in data transmission, processing, and storage may result in an inability to timely process and/or store the data. For example, in instances where data may need to be processed and/or analyzed within a 24-hour period, latency in data transmission and storage past this deadline will result in incomplete data analysis.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
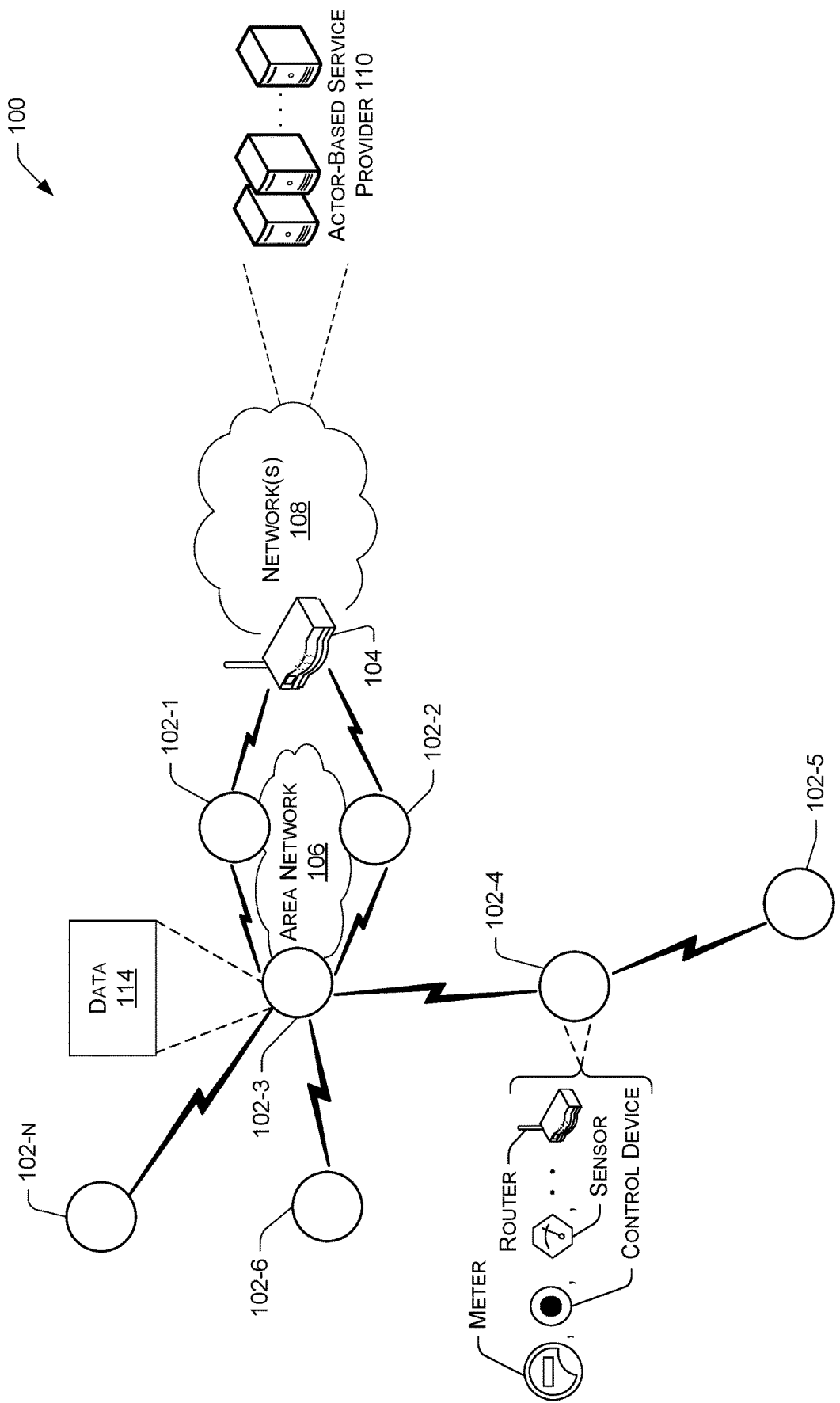
FIG. 1 is a schematic diagram of a network architecture, according to an example of the principles described herein.

As presented above, in networks including large numbers of physical devices (e.g., tens of thousands, hundreds of thousands, or even millions of devices) it can be difficult to ensure that data received from all of the physical devices can processed and stored in a persistent data storage. That is, the incoming data must be processed and stored at a rate to at least keep pace with the rate at which the data is received. In some examples, the incoming data may need to be received, processed and stored at a rate faster than a rate at which the data is received from the physical devices in order to meet quality of service (QoS) or other requirements. This application relates to the use of actors including virtual representations of physical devices (sometimes referred to as "digital twins"). As used in the present specification and in the appended claims, the terms "digital twin," "actor" and similar language is meant to be understood broadly as any digital representation of physical computing devices or hardware. In one example, the actors described herein function as digital representations of a number of metrology devices or other type of networked computing devices. By way of example and not limitation, the metrology devices may include utility meters (e.g., electricity meters, water meters, gas meters, etc.), transformers, relays, end points, smart sensors, appliances, internet-of-things (IoT) devices, or the like. When the physical devices collect data associated with their functions within a physical environment and within their physical network, the data may be used to update the digital representation of the physical device (i.e., the actor corresponding to the device) stored in memory with the state of the metrology device in real time or near real time. In this manner, the actors described herein are meant to be up-to-date and accurate copies of the physical devices and any data associated with the physical devices.

In the case of metrology devices, such as utility meters, data associated with the metrology devices may include, for example, the respective characteristics, properties, measured quantities, states, statuses, and/or locations of the physical devices (e.g., metrology devices), data related to the execution of distributed intelligence (DI) software, load disaggregation data, data related to the data collection functions of the metrology devices, metrology data, heartbeat data, event data, critical event data, data defining utility usage, data defining utility loss events (e.g., utility theft), high impedance detection (HID) event data, load disaggregation data, broken neutral event data, data defining a topology of a network within which the metrology device is included, data defining the metrology device and/or its functions, an electronic serial number associated with the metrology device, a model number of the metrology device, an operating system executed on the metrology device, software and/or firmware executed on the metrology device, advanced metering infrastructure (AMI) meter consumption data, other types of data, data related to charging amounts and time to a full charge within a battery-powered device, data defining particulate levels of, for example, pollution in the air as detected by a pollution sensor, and combinations thereof. Further, because the systems and methods described herein may be used in any networking scenario and in association with any type of computing or electronic devices within the network, any types of data may be transmitted from the network to the actors of the actor-based service provider and provide the functionality of the present systems and methods to those types of data.

In the examples described herein, the actors may be updated by their respective physical devices on a regular basis. However, the data latency issue addressed above in connection with the physical devices within the network is pushed to the actors in this virtual environment where each of the actors must compete for the transmission of data packets to the persistent data storage device. In an actor-based system described above, the data for each actor is stored locally in memory associated with each actor. If each actor independently pushed its data to the persistent data store, a similar inefficient and low data throughput scenario would result. To meet a desired and relatively higher throughput requirement, the present systems and methods utilize a number of data streams to efficiently load data using bulk loading techniques.

In one example, some software may take days to ingest load disaggregation data for millions of physical devices (e.g., metrology devices). The bulk load systems and methods described herein serve as part of the solution that significantly reduces data ingestion time. The systems and methods described herein may ingest data (e.g., process and store data in persistent memory) at rates exceeding the rate at which the data is received from the physical devices and, in some examples, at real-time or near real-time rates (e.g., from more than a 24 hour period to a period of several hours).

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management or any other type of wireless or wired network. Unless specifically described to the contrary, the techniques described herein applicable to any communications network, control network, and/or another type of network or system. In one example, the techniques may be implemented in the context of the Internet of Things (IoT).

Overview

The present systems and methods provide for the use of a number of stream partitions to transmit data from a plurality of actors to a persistent data storage device in a manner such that latency is significantly reduced. The actors use a stream partition manager to determine which of a plurality of stream partitions to utilize. The stream partition manager acts as a load balancer to reduce hot spots within the system and network. Once a stream partition has been assigned to the actor, the actor publishes data to the stream partition. Data for each stream partition is handled by a respective stream processor allowing for the parallelization of data processing. This stream processor collects a batch of records and inserts the data into a stream staging table at recurring intervals. Because each stream partition includes a dedicated staging table, this reduces contention at the persistent data storage device and improves throughput. The stream processors are communicatively coupled to a merge manager to coordinate activity with a target table (e.g., a persistent data storage device). The use of the merge manager also reduces contention between the data streams on the target table allowing for maximum throughput and reduction in data transmission latency.

Examples described herein provide a system including a stream partition manager configured to receive data packets input from a plurality of actors, the actors including virtual representations of physical devices, and partition the data packets into a number of stream partitions based at least in part on one or more criteria. The system further includes a plurality of stream processors communicatively coupled to the stream partition manager. Individual stream processors of the plurality of stream processors being configured to receive data packets from a stream partition of the number of stream partitions, process the data packets to generate multiple table entries, and transmit the multiple table entries in batches. The system further includes a target table communicatively coupled to the plurality of stream processors. The target table is configured to receive and store the batches received from the individual stream processors.

The system further includes a plurality of staging tables interposed between the plurality of stream processors and the target table to receive the batches from the individual stream processors prior to transmission to the target table. Individual staging tables are provided for the number of stream partitions.

The system further includes a merge manager interposed between the plurality of staging tables and the target table to coordinate uploading of the batches from individual staging tables of the plurality of staging tables to the target table. The plurality of staging tables and the target table include a same database schema.

The target table is a first target table and is associated with a first application running on at least some of the plurality of actors. The system further includes a second target table associated with a second application running on at least some of the plurality of actors, the second application being different than the first application. The staging tables are updated in first batches at a first frequency and the target table is updated in second batches at a second frequency, the second frequency being different than the first frequency. The physical devices may include metrology devices.

The stream partition manager is configured to assign a stream identifier (ID) to each actor of the plurality of actors. The stream ID identifies a respective stream partition to which the respective actor is assigned, and each actor of the plurality of actors writes data to the respective stream partitions based on their respectively assigned stream IDs.

Examples described herein also provide a method including, with a stream partition manager, receiving data packets input from a plurality of actors, the actors including virtual representations of physical devices, and partitioning the data packets into a number of stream partitions based at least in part on one or more criteria. The method also includes, with individual ones of a plurality of stream processors communicatively coupled to the stream partitions, receiving the data packets from a stream partition of the number of stream partitions, processing the data packets to generate multiple table entries, and transmitting the multiple table entries in batches. The method further includes, with a plurality of staging tables, receiving the batches from the individual stream processors, wherein individual staging tables are provided for the number of stream partitions. THE method further includes, with a target table communicatively coupled to the plurality of staging tables, receiving, and storing the batches from individual staging tables of the plurality of staging tables.

The method further includes, with a merge manager interposed between the plurality of staging tables and the target table coordinating uploading of the batches from individual staging tables to the target table. The plurality of staging tables and the target table include a same database schema. The physical devices may include metrology devices.

The method further includes, with the stream partition manager, assigning a stream identifier (ID) to each actor of the plurality of actors, the stream ID identifying a respective stream partition to which the respective actor is assigned. The method further includes, with each respective actor, writing data to the respective stream partition associated with the stream ID assigned to the respective actor.

The target table may include a first target table associated with a first application running on at least some of the plurality of actors, and a second target table associated with a second application running on at least some of the plurality of actors, the second application being different than the first application.

Examples described herein also provide a non-transitory computer-readable medium storing instructions that, when executed, causes a processor to perform operations. The operations include, with a stream partition manager, receiving data packets input from a plurality of actors. The actors include virtual representations of physical devices. The operations also include partitioning the data packets into a number of stream partitions based at least in part on one or more criteria. The operations also include, with individual ones of a plurality of stream processors communicatively coupled to the stream partitions, receiving the data packets from a stream partition of the number of stream partitions, processing the data packets to generate multiple table entries, and transmitting the multiple table entries in batches. The operations also include, with a merge manager, receiving the batches from the stream processors, and coordinating uploading of the batches. The operations further include, with a target table communicatively coupled to the merge manager, receiving and storing the batches received from individual stream processors of the plurality of stream processors.

The operations further unclude, with a plurality of staging tables interposed between the plurality of stream processors and the target table, receiving the batches from the individual stream processors prior to transmission to the target table. Individual staging tables may be provided for the number of stream partitions. The plurality of staging tables and the target table include the same database schema. The plurality of staging tables are updated in first batches at a first frequency and the target table is updated in second batches at a second frequency where the second frequency being different than the first frequency. The target table may include a first target table associated with a first application running on at least some of the plurality of actors, and a second target table associated with a second application running on at least some of the plurality of actors where the second application being different than the first application.

The operations further include, with the stream partition manager, assigning stream identifier (ID) to each actor of the plurality of actors, the stream ID identifying a respective stream partition to which a respective actor of the plurality of actors is assigned, and, with each respective actor, writing data to the respective stream partition associated with the stream ID assigned to the respective actor.

Additionally, the techniques described in this disclosure may be performed as a method and/or by a system having non-transitory computer-readable media storing computer-executable instructions that, when executed by one or more processors, performs the techniques described above.

Example Environment

FIG. 1 is a schematic diagram of a network architecture 100, according to an example of the principles described herein. The network architecture 100 includes multiple physical devices 102-1, 102-2, 102-3, 102-4, 102-5, 102-6, . . . 102-N (collectively referred to herein as physical device(s) 102) and a network communication device 104, where N is any integer greater than or equal to 1. The physical devices 102 and the network communication device 104 may be in communication with one another via an area network (AN) 106. In the example of FIG. 1, the network communication device 104 is implemented as an edge device, which serves as a connection point of the AN 106 to one or more networks 108 (e.g., a backhaul network), such as the Internet. The network communication device 104 may include, but is not limited to, a field area router (FAR), a cellular relay, a cellular router, an edge router, a DODAG (Destination Oriented Directed Acyclic Graph) root, a root device, node of the AN 106, a combination of the foregoing, or similar devices. In this example, the network communication device 104 relays communications from the AN 106 to an actor-based service provider 110 via the one or more networks 108. Any of the physical devices 102, the network communication device 104, and/or the actor-based service provider 110 may perform data processing related to the actor-based data processing as described herein. The computing devices included within the network 108 may also include data collectors, relays, routers, and any other type of intermediary or additional computing devices.

The actor-based service provider 110 may receive data packets from the area network 106 and/or the networks 108 using any combinations of hardware and software. The hardware may include any computing device including, for example, a number of servers. The software executed by the network architecture 100 may include any headend software suite that includes applications to assist in the collection, transmission, and/or management of the data packets relative to the actor-based service provider 110. In one example, the software executed by the network architecture 100 may include the OpenWay® CENTRON metrology software developed and distributed by Itron, Inc. The OpenWay® CENTRON metrology software provides advanced metering and/or smart grid functionality used, in conjunction with the physical devices 102 (e.g., a metrology device) to collect, process, and transmit metrology data to a service provider such as, for example, the actor-based service provider 110. Any type of data including calculations, utility usage data, and other types and forms of data described herein may be calculated within the physical device 102 (e.g., a metrology device) in order to leverage time-based rates, demand response, home networking, and other smart grid applications.

In one example, the software executed by the network architecture 100 may include a headend software such as, for example, UtilityIQ® (UIQ) headend software suite developed and distributed by Itron, Inc. UIQ headend software suite may assist in collection and management of AMI meter consumption data.

As used herein, the term "area network" (AN) refers to a defined group of physical devices 102 that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual physical device 102 and/or network communication device 104 may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In one example, the plurality of channels includes Radio Frequency (RF) channels.

The AN 106 may include a mesh network, in which the network communication devices relay data through the AN 106. Alternatively, or additionally, the AN 106 may include a star network, in which a central device acts a parent to one or more children devices. Further, in one example the AN 106 may include a portion that is implemented as a mesh network and a portion that is implemented as a star network. Moreover, in other examples the AN 106 may be implemented in whole or part by other types of networks, such as hub-and-spoke networks, mobile networks, cellular networks, etc. In one example, a device may be able to communicate with multiple different types of networks (e.g., a mesh network and a star network) at the same or different times. For example, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In one example, the actor-based service provider 110 includes one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In one example, the actor-based service provider 110 includes other systems to implement other functionality, such as web services, cloud services, and so on. In one example, the actor-based service provider 110 may be implemented as other types of devices, such as in the context of the Internet of Things (IoT) that allows a variety of devices to exchange data.

The actor-based service provider 110 may be physically located in a single central location, or it may be distributed at multiple different locations. The actor-based service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As noted above, any of the physical devices 102, the network communication device 104, and/or the actor-based service provider 110 may process and/or transmit any type of data 114 described herein for storage in, for example, a persistent storage device included in the actor-based service provider 110. The data 114 associated with the physical devices 102 (e.g., metrology devices) may include, for example, the respective characteristics, properties, states, statuses, and/or locations of the physical devices 102, data related to the execution of distributed intelligence (DI) software, load disaggregation data, data related to the data collection functions of the physical devices 102, metrology data, heartbeat data, event data, critical event data, data defining utility usage, data defining utility loss events (e.g., utility theft), high impedance detection (HID) event data, load disaggregation data, broken neutral event data, data defining a topology of a network within which the physical devices 102 is included, data defining the physical devices 102 and/or its functions, an electronic serial number associated with the physical devices 102, a model number of the physical devices 102, an operating system executed on the physical devices 102, software and/or firmware executed on the physical devices 102, advanced metering infrastructure (AMI) meter consumption data, other types of data, and combinations thereof. Further, because the systems and methods described herein may be used in any networking scenario and in association with any type of computing or electronic devices within the network 108, any types of data 114 may be transmitted from the network 108 to and/or on behalf of the actors of the actor-based service provider 110.

The physical devices 102 may transmit and/or receive one or more communications/transmissions (e.g., Protocol Data Units (PDUs), such as bits, frames, packets, segments, etc.) with any device included within the network 108 such as other physical devices, the network communication device 104, and the actor-based service provider 110. In this manner, the data 114 transmitted by the physical devices 102 may be transmitted directly or indirectly to the actor-based service provider 110.

Figure 2:
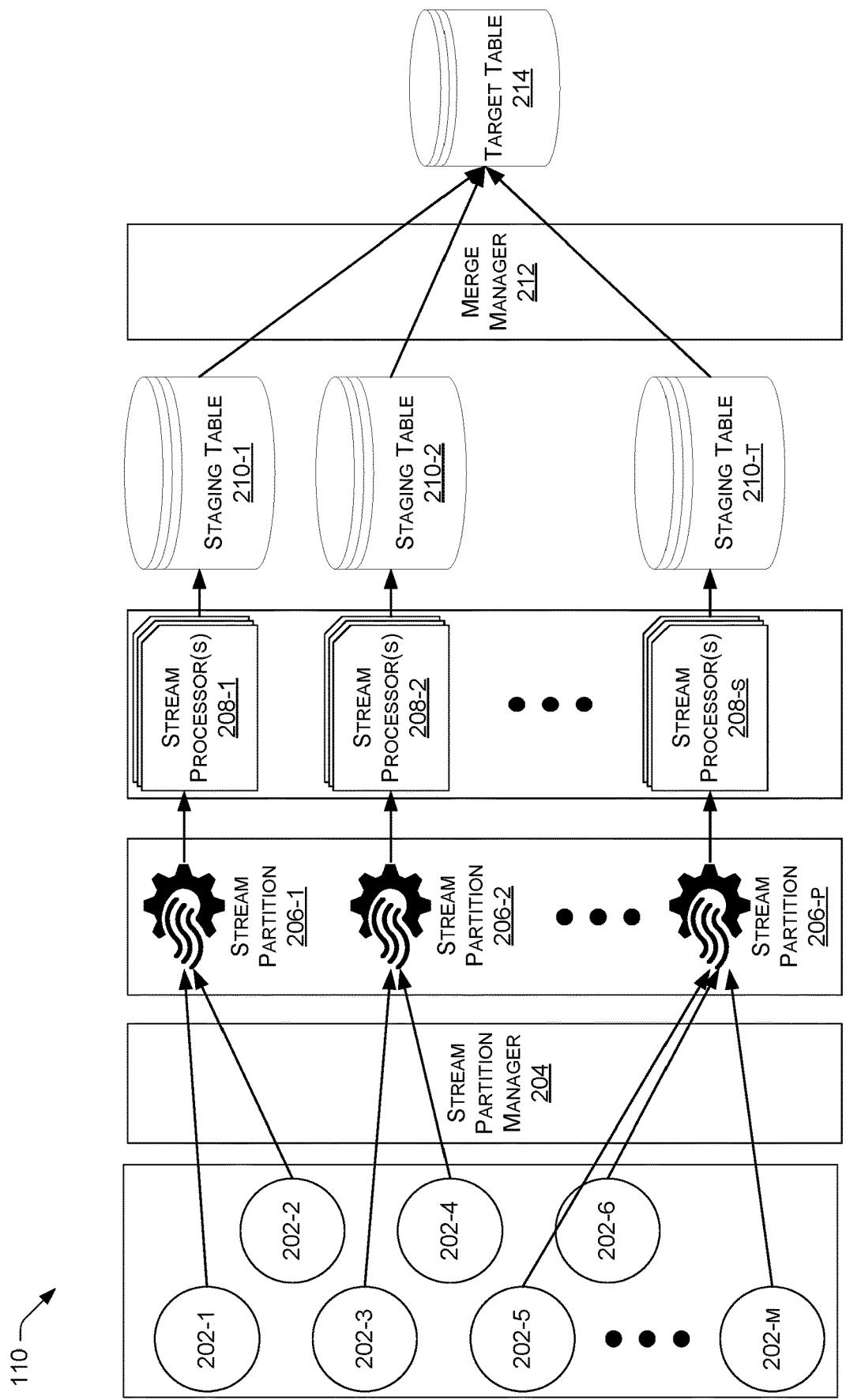
FIG. 2 is a schematic diagram of an actor-based data processing system, according to an example of the principles described herein.

The actor-based service provider 110 will now be described in connection with FIGS. 1 and 2. FIG. 2 is a schematic diagram of an actor-based data processing system that serves as part of the actor-based service provider 110 and its functionality, according to an example of the principles described herein. The actor-based service provider 110 may include multiple actors 202-1, 202-2, 202-3, 202-4, 202-5, 202-6, ... 202-M (collectively referred to herein as actor(s) 202), where M is any integer greater than or equal to 1. The actors 202 may include virtual representations of each of the individual physical devices 102 depicted in FIG. 1. Thus, the actors 202 are any digital companion for and/or digital representation of the physical devices 102 depicted in FIG. 1. The actors 202, being virtual reparations of the physical devices 102, may be used to view a status or state of one or more of the physical devices 102. This relationship between the actors 202 and the physical devices 102 provides a way to project the physical computing hardware of the physical devices 102 into a virtual network of actors 202. In one example, the actors 202 described herein function as virtual representations of a number of metrology devices or other type of networked computing devices. For example, when the physical devices 102 (e.g., metrology devices) collect data associated with their functions within a physical environment and within their physical network, the data may be used to update a "digital twin" or virtual copy of the state of the actors 202 (e.g., metrology devices) in at least one of real time or near real time. In this manner, the actors described herein are meant to be up-to-date and accurate copies of the physical devices 102 of FIG. 1 and any data associated with the physical devices 102. In the examples described herein, a headend software such as the OpenWay® CENTRON metrology software and/or the UIQ headend software suite described herein may be utilized to feed data to and create the actors 202 as virtual representations of the physical devices 102.

As depicted in FIG. 2, the actors 202 may be stored in memory of the actor-based service provider 110. In one example, the number of actors 202 (and the corresponding number of physical devices 102) may be on the order of millions of actors 202. With these large numbers of actors 202 where each actor 202 independently pushes its collected data to a persistent data store, it would be very inefficient and result in low data throughput. In this example, each individual actor 202 may make a connection to a database and run a query to insert data into or otherwise update a table included within the database. With millions of physical devices 102 located in the field and, correspondingly, millions of actors 202 in memory all making the connection to the database and seeking to write, for example, a few rows of data at a time, this leads to an extremely inefficient method of writing data to the database (e.g., the persistent data storage device). Further, this method is not scalable such that if more actors 202 were added to the network, the system may not be able to handle the addition of these resources efficiently or at all.

To meet a relatively higher data throughput requirement, the actor-based data processing system depicted in FIG. 2 that serves as part of the actor-based service provider 110 is designed to efficiently load data using stream partitions and bulk loading techniques. The actor-based service provider 110 includes a stream partition manager 204 to assign each actor 202 to one of a plurality of stream partitions 206-1, 206-2, . . . 102-P (collectively referred to herein as stream partition(s) 206), where P is any integer greater than or equal to 1. The stream partition manager 204 may create or assign the actors 202 to any number of stream partitions 206. In one example, the number of stream partitions 206 created or to which the actors 202 are assigned to may be in the tens (e.g., 10, 20, 30. . . stream partitions 206) as compared to the millions of actors 202.

The stream partition manager 204 acts as a load balancer to determine a number of stream partitions 206 to include within the system, and which of the plurality of stream partitions 206 to utilize for an individual actor 202. In this manner, the stream partition manager 204 acts to reduce hot spots within the system and network by creating more or fewer stream partitions 206 as needed for the number of actors 202 within the system. The system may be scaled up by adding additional virtual machines and/or underlying servers that serve the individual stream partitions 206. Further, because the stream partition manager 204 is able to create and assign stream partitions 206 to the actors 202, the system is easily scalable by allowing or instructing the stream partition manager 204 to create more or fewer stream partitions 206 based on the number of actors 202. For this reason, scaling down and relinquishing a number of virtual machines and/or underlying servers is also possible.

The stream partition manager 204 receive data packets input from the plurality of actors 202 and partition the data packets into a number of stream partitions based at least in part on one or more criteria. In one example, the criteria may include a round robin (RR) scheduling process and software executed by the actor-based service provider 110. The RR scheduling process may include the assignment of the actors 202 to a specific stream partition 206 based on the next stream partition within a circular order of stream partitions 206. For example, if the stream partition manager assigns actor 202-1 to stream partition 206-1, the next actor 202 (e.g., actor 202-2) is assigned to stream partition 206-2, and the next actor 202 (e.g., actor 202-3) may be assigned to a next stream partition 206, and so on until all stream partitions 206 have been assigned a first actor 202. At that point, a second round of assignments may take place to assign more of the actors 202 to the stream partitions 206 in the same order as the first round of assignments. This order of assigning actors 202 to the stream partitions may be executed by the stream partition manager 204 until all actors 202 have been assigned to a stream partition 206. In the RR scheduling process, the actors 202 may be assigned in any order, but the order in which the stream partitions 206 are assigned actors 202 may be in the round robin manner.

Although a RR scheduling process has been described herein as a criteria for the partitioning of the data packets from the actors 202 into a number of the stream partitions 206, any criteria or process may be used to determine which actor 202 is assigned to a particular stream partition 206 (e.g., which data packets from the actors 202 are to be sent via a particular stream partition 206). Other criteria may include a first-in-first-out process where a first actor 202 that queries the stream partition manager 204 for an assigned stream partition 206 with be the first to be assigned and subsequent actors 202 are assigned in consecutive order based on a queue of actors 202.

In one example, the stream partition manager 204 is configured to assign a stream identifier (ID) to each of the actors 202. The stream ID identifies a respective stream partition 206 to which the respective actor 202 is assigned. The actors 202 write data to the respective stream partitions 206 based on their respectively assigned stream IDs. In one example, the stream IDs assigned to the actors 202 may be assigned as the actors 202 submit a query in the first-in-first-out process described above. Because the stream partition manager 204 is software based, operates in memory, and runs within the same process as the actors 202, processing performed by the stream partition manager 204 may be performed faster relative to, for example, writing data to a physical disk.

In one example, the stream IDs assigned to the actors 202 may be stored in a database of the actor-based service provider 110. Further, in one example, the stream IDs assigned to the actors 202 may be permanently assigned to the actors once assigned by the stream partition manager 204 or may be temporarily assigned to the actors 202. However, in the examples described herein, the stream IDs are not persistent, are temporary, and an actor 202 may be assigned a first stream partition 206 in a first instance of data packet transmission and a second stream partition 206 in a subsequent instance of data packet transmission. In this manner, in each instances of an actor 202 having data to transmit, it may be assigned to a different stream partition 206.

In order for the stream partition manager 204 to effectively transmit the data packets from the actors 202 via the stream partitions 206, the stream partitions 206 utilize a message bus such as, for example, RabbitMQ™ message-broker software developed and distributed by Pivotal Software, Inc. The message bus executed by and/or as part of the stream partition manager 204 obtains the efficient transfer of data via the stream partitions 206, establishes a connection with a number of downstream devices, ensures a recipient queue exists, and sends a number of messages including the data packets of the actors 202. In this manner, the message bus assists the stream partition manager 204 in managing a workload queue for the actors 202, provides message delivery, and manages transactions between the actors 202 and the stream partition manager 204.

The actors 202 send their respective data packets via their assigned stream partitions 206. For each stream partition 206, a number of stream processor(s) 208-1, 208-2, . . . 108-s (collectively referred to herein as stream processor(s) 208), where s is any integer greater than or equal to 1, may be provided to process the data packets. Each stream partition 206 includes at least one stream processor 208. In one example, each stream partition 206 includes a plurality of stream processors 208. In one example, the stream processors 208 include a number of software-based virtual processors supported by a number of underlying multi-core processors. In one example, the actors 202 and/or the stream processors 208 may be supported by any number of multi-core processors distributed across a cluster of computing devices such as server computing devices. Thus, the actor-based service provider 110 may be distributed across a cluster of computing devices, and, in one example, may include a plurality of server computers from which the virtual machines needed to perform the functionality of the actor-based service provider 110 in an efficient manner may be added. In this manner, scaling up to obtain additional virtual resources may be performed by adding additional virtual machines as provided by the underlying cluster of computing devices and their respective computing resources. Thus, the present systems and methods provide for the ability to scale up by adding additional virtual machines and/or underlying servers that serve the individual stream partitions 206. Also, should one of the virtual machines and/or underlying servers go down (fail), the other virtual machines and/or underlying servers can take over and fill the computational needs. The cluster of servers utilized as the underlying computing resources may include a number of privately-host servers, a number of enterprise-hosted servers, a cloud network of servers, and combinations thereof.

Although the amount of data sent by the actors 202 in total may be on the scale of terabytes, the size of individual data packets transmitted by individual actors 202 may be on the scale of a few bytes. Thus, the stream processors 208 receive the data packets from the actors 202 via the stream partitions 206 and process the data packets to generate multiple table entries. Stated another way, the data packets sent by the actors 202 may be collected into organized table entries. The stream processors 208 may collect the data packets into the table entries for a predetermined amount of time, until a predetermined number of table entries have been reached, or when some other type of benchmark is reached. In one example, the number of table entries within a batch may be between 1,000 and 10,000 table entries. In one example, the number of table entries within a batch may be 5,000 table entries (e.g., 5,000 rows of data). In one example, a default number of table entries may be set either automatically or by a user. These multiple table entries may be transmitted by the stream processors 208 in batches. Thus, rather than transmitting millions of smaller data packets originally transmitted by the actors 202, it is more computationally efficient to send this data in batches.

The stream processors 208 may send the batches to a respective staging table 210. In one example, each stream processor 208 or set of stream processors 208 within a stream partition 206 may include a respective staging table 210. Thus, an individual stream partition 206 may include a respective staging table 210. Once the stream processors 208 have reached a benchmark at which the tables entries are to be transited in a batch, the stream processors 208 transmit that batch of table entries to the staging table 210. The staging tables 210 receive the batches from their respective stream processors 208 in preparation for sending those batches of table entries onto the target table for persistent storage. In this manner, when it comes time for the staging tables 210 to push the batches to the target table 214, the data is presented in a compiled and uploaded form for efficient uploading to the target table 214. In one example, any bulk load algorithm may be used to assist in creating the batches and uploading the batches from the stream processors 208 to the staging tables 210 and from the staging tables 210 to the target table 214. Transmitting the table entries in batches using a bulk load algorithm creates an efficient way to upload data from the stream partitions 206 onto the staging tables 210 and the target table (e.g., from an application server to a database server).

In one example, the number of staging tables 210 created to service the stream partitions 206 is based on a determination of the number of stream partitions 206 that are needed at startup. Thus, at startup, a number of staging tables 210 are created with one staging table 210 being created for each stream partition 206. The batches of table entries (e.g., 5,000 table entries) are uploaded to the staging tables 210 by the stream processors 208 and the staging tables 210 upload the batches to the target table 214. After each batch is uploaded to the target table 214, the rows of table entries within the staging tables 210 are deleted. In this manner, the staging tables 210 are reused for each batch uploaded to the staging table 210.

The staging tables 210 are not deleted until an instance of system restart takes place. In one example, at system startup, old staging tables 210 existent in the system may be deleted, and new staging tables may be created. This allows for different data schemas to be processed using the same physical and virtual infrastructures and/or different numbers of stream partitions 206. In one example, the number of stream partitions 206 to be executed at startup may be based on user-defined parameters where a user such as an administrator may determine the number of stream partitions 206 the system should include. The user may make such determinations based on a knowledge of the number of actors 202 that are to be serviced via the system in that startup instance. Thus, if the user determines that throughput of the data may be improved, the user may request, at startup or otherwise, allocation of additional computing resources including the creation of additional stream partitions 206, stream processors 208, and/or staging tables 210 to increase throughput of data within the system.

The staging tables 210 include a database schema that is at least similar to a database schema of the target table 214 to which the batches are to be written. Stated another way, there is a one to one relationship between the database schema of the staging tables 210 and the database schema of the target table 214. In one example, the target table 214 may include x-number of fields within its database schema, and the staging tables 210 may each have the same x-number of fields. In one example, the staging tables 210 may include an extra field beyond the number of fields of the target table 214 where the extra field includes, for example, an auto-incrementing key. For example, a database schema definition for the staging tables 210 and the target table 214 may include the following:

Staging Table Schema:
   RowId (auto-incrementing primary key)
   1 . . . n columns
Target Schema:
   1 . . . n columns
Where "1 . . . n columns" is any number of columns. The name and data type of these 1 . . . n columns match between the database schema of the staging tables 210 and the database schema of the target table 214.
For example:
Staging Table Schema:
   RowId (auto-incrementing integer)
   Field 1 (integer)
   Field 2 (string)
   Field 3 (byte[ ])

Target:
    Field 1 (integer)
    Field 2 (string)
    Field 3 (byte[ ])

The creation of the number of fields within the target table 214 and the staging tables 210 may be performed dynamically based on models and software (e.g., applications) being executed within the network architecture 100 and among the physical devices 102 that is then reflected within the virtual space of the actor-based service provider 110. The models may include topology information such as, for example, relationships of the physical devices 102, the network communication device 104, the AN 106, the networks 108, and the actor-based service provider 110. The models may also include device information such as, for example, serial numbers, metrology data, events detected at the physical device 102 (e.g., metrology device), applications running on the physical devices 102 such as disaggregation data applications, etc., and other types of device-related information.

As an example, the data schema of the target table 214 may include a heartbeat event data schema that collects and stores data related to heartbeat events of the physical devices 102 as reflected in the actors 202. This heartbeat event data schema may include four fields. These four fields are included within the target table 214 and the same four fields are included in each of the staging tables 210 related to the models and software (e.g., applications) being executed within the network architecture 100. In one example, the staging tables 210 may include an additional field defining an auto-incrementing key as described above.

In one example, the data schema of the target table 214 may include a high impedance detection (HID) event data schema that collects and stores data related to detection of high impedance events within the network architecture 100 as detected by the physical devices 102 and reflected in the actors 202. This HID event data schema may include 15 fields. These 15 fields are included within the target table 214 and the same 15 fields are included in each of the staging tables 210 related to the models and software (e.g., applications) being executed within the network architecture 100 that handle high impedance detection.

With these examples in mind, the type of application being executed within the network architecture 100 and among the physical devices 102 may determine the data schema of the target table 214 and the staging tables 210. The data collected for a first application is processed using the same set of staging tables 210 and target table 214. However, data collected for a second application is processed using a second set of staging tables 210 and a second target table 214 that includes a different database schema relative to the processing performed for the first application. The actor-based data processing system that serves as part of the actor-based service provider 110 may be duplicated for any number of applications that run on any number of the physical devices 102 with in the network architecture 100 and which are reflected as the actors 202 within the actor-based service provider 110. A target table 214 may be prepared for each of the applications, and a respective number of sets of staging tables 210 may be created for each of the target tables 214. When viewed in light of FIG. 2, the plurality of applications may be executed in the actor-based service provider 110 using a respective plurality of sets of devices depicted in FIG. 2. This allows for the actor-based service provider 110 to be vertically scalable to accommodate for the plurality of applications with each application being allocated a respective stream partition manager 204, stream partitions 206, stream processors 208, staging tables 210, merge manager 212, and target table 214. In this manner, the target table 214 may include a first target table associated with a first application running on at least some of the plurality of actors, and a second target table associated with a second application running on at least some of the plurality of actors where the second application is different than the first application. For example, a first application may be executed to obtain data related to HID event data and may produce a HID event database schema within its respective staging tables 210 and target table 214. A second application may be executed to obtain data related to load disaggregation data and may produce a load disaggregation database schema within its respective staging tables 210 and target table 214.

The actor-based data processing system that serves as part of the actor-based service provider 110 as depicted in FIG. 2 may also include a merge manager 212. The stream partition manager 204, stream partitions 206, stream processors 208, and staging tables 210 provide for the parallelization of data processing for the actors 202 to obtain maximum throughput of data. The merge manager 212 serves to upload the batches of data entries produced by the stream processors 208 and staged at the staging tables 210 to the target table 214. In one example, the merge manager 212 causes the batches of data entries to be uploaded to the target table 214 one at a time. Because the batches of data entries from each staging table 210 may be ready for upload to the target table 214 at different times, the merge manager 212 may employ a first-in-first-out algorithm where the staging tables 210 are served one at a time, and that the staging table 210 that has been waiting the longest is served first. In this manner, the merge manager 212 creates a queue for the target table 214 to upload the batches of data entries from the staging tables 210 in a serial manner. In this manner, performance issues that may arise with regard to the building of indexes, allocating pages, etc. within the target table 214 if multiple processes were allowed to hit the target table 214 at the same time is overcome through the use of the merge manager 212.

Turning to the target table 214, the target table 214 may include any persistent data storage device. As mentioned above, the processing performed by actors 202, the stream partition manager 204, the stream partitions 206, the stream processors 208, the staging tables 210, and the merge manager 212 may be performed using an underlying application server. The functionality of the target table 214 may be performed using an underlying database server. In this manner, the target table 214 may be a virtual device supported by a data storage device. In the examples described herein, the actor-based service provider 110 may be deployed on any computing device such as a server computing device and does not depend on any third party software. Thus, the user is not beholden to technologies held or implemented by another entity, and is not beholden to big data systems, among other costly third party systems.

In the examples described herein, the present systems and methods seek to obtain a desired quality of service (QoS) levels that provides a throughput of data from the physical devices 102 within the network architecture 100 to the actors 202 and/or from the actors 202 to the target table 214 within a 24 hour period to allow for daily analysis of the data as it is captured by the physical devices 102 in the field. In one example, the QoS level may provide a throughput of less than 24 hours. In one example, the QoS level may provide a throughput of less than 8 hours. In one example, the QoS level may provide a throughput of real-time data processing or near real-time data processing. The desired throughput may be achieved by allocating virtual devices to assist in the data collection and storage via the actor-based service provider 110, and the allocation of these virtual devices may define the QoS level achievable through that allocation.

Figure 3:
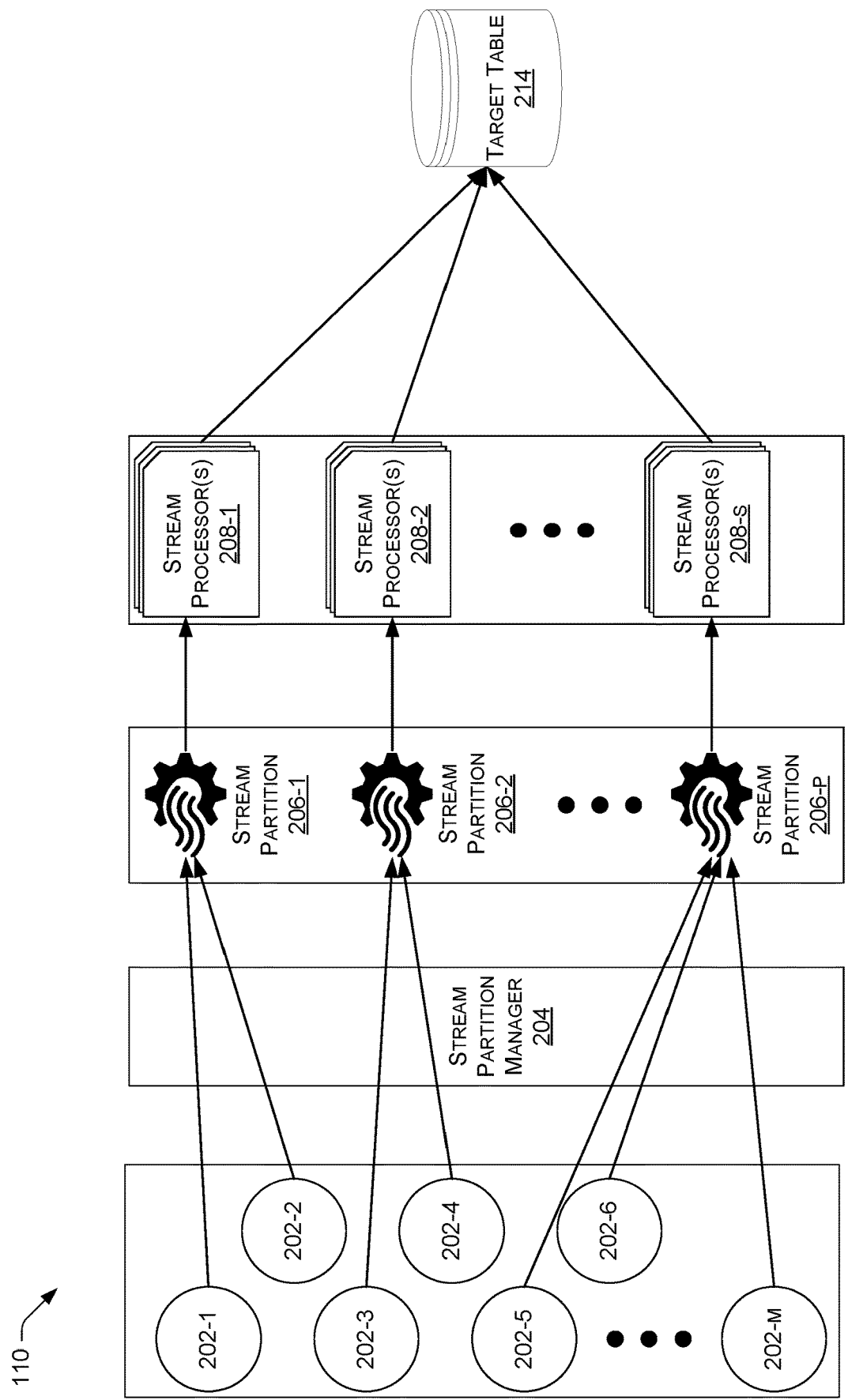
FIG. 3 is a schematic diagram of an actor-based data processing system, according to an example of the principles described herein.

FIG. 3 is a schematic diagram of an actor-based data processing system, according to an example of the principles described herein. In the example of FIG. 3, the staging tables 210 and merge manager 212 depicted in FIG. 2 are removed. In this example, the process performs in a similar manner as to the actors 202, stream partition manager 204, and stream partitions 206. However, the stream processors 208 of FIG. 3 may transmit batches of, for example, 5,000 table entries directly to the target table 214. Although in this example, contention may arise between stream processors 208 as the stream processors 208 seek to upload their batches to the target table 214, the parallelization of the data processing via the stream partition manager 204 and stream partitions 206 assists in bringing the number of processes down from a number on the order of millions to a number on the order of tens.

Figure 4:
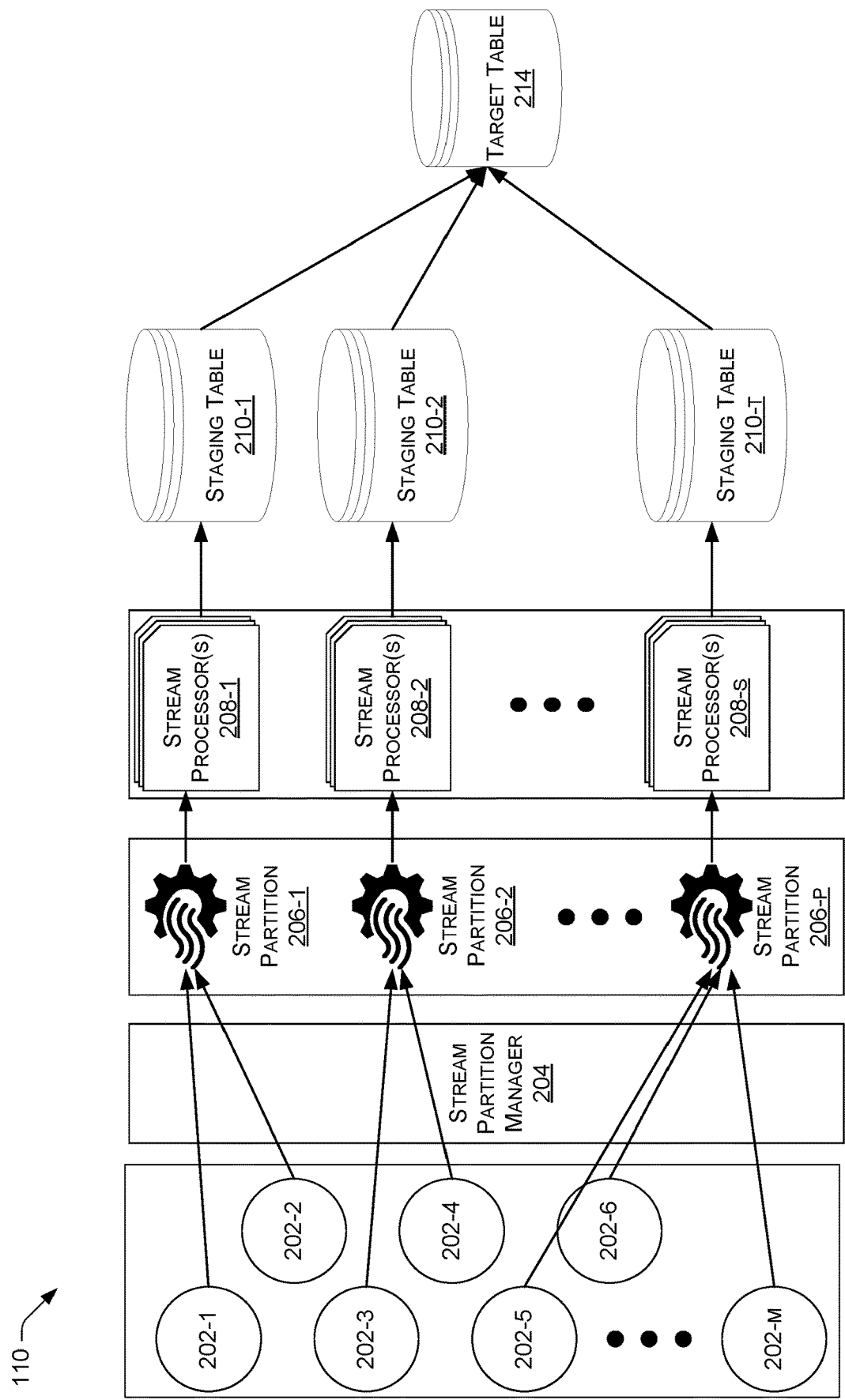
FIG. 4 is a schematic diagram of an actor-based data processing system, according to an example of the principles described herein.

FIG. 4 is a schematic diagram of an actor-based data processing system, according to an example of the principles described herein. In the example of FIG. 4, the merge manager 212 depicted in FIG. 2 is removed. In this example, the process performs in a similar manner as to the actors 202, stream partition manager 204, stream partitions 206 and stream processors 208. However, the staging tables 210 would be tasked with uploading the batches contained therein to the target table 214. In this example, contention may arise between staging tables 210 seeking to upload their batches to the target table 214 simultaneously. However, the stream processors 208 in the example of FIG. 4 may assume the function of an orchestrator to instruct the staging tables 210 to upload the batches to the target table 214, and the parallelization of the data processing via the stream partition manager 204, the stream partitions 206, the stream processors 208, and the staging tables 210 assists in bringing the number of processes down from a number on the order of millions to a number on the order of tens. Thus, the addition of the staging tables 210 in the example of FIG. 4 relative to the example of FIG. 3 extends the parallelization of the data processing as far as possible before merging of the data at the target table 214.

Figure 5:
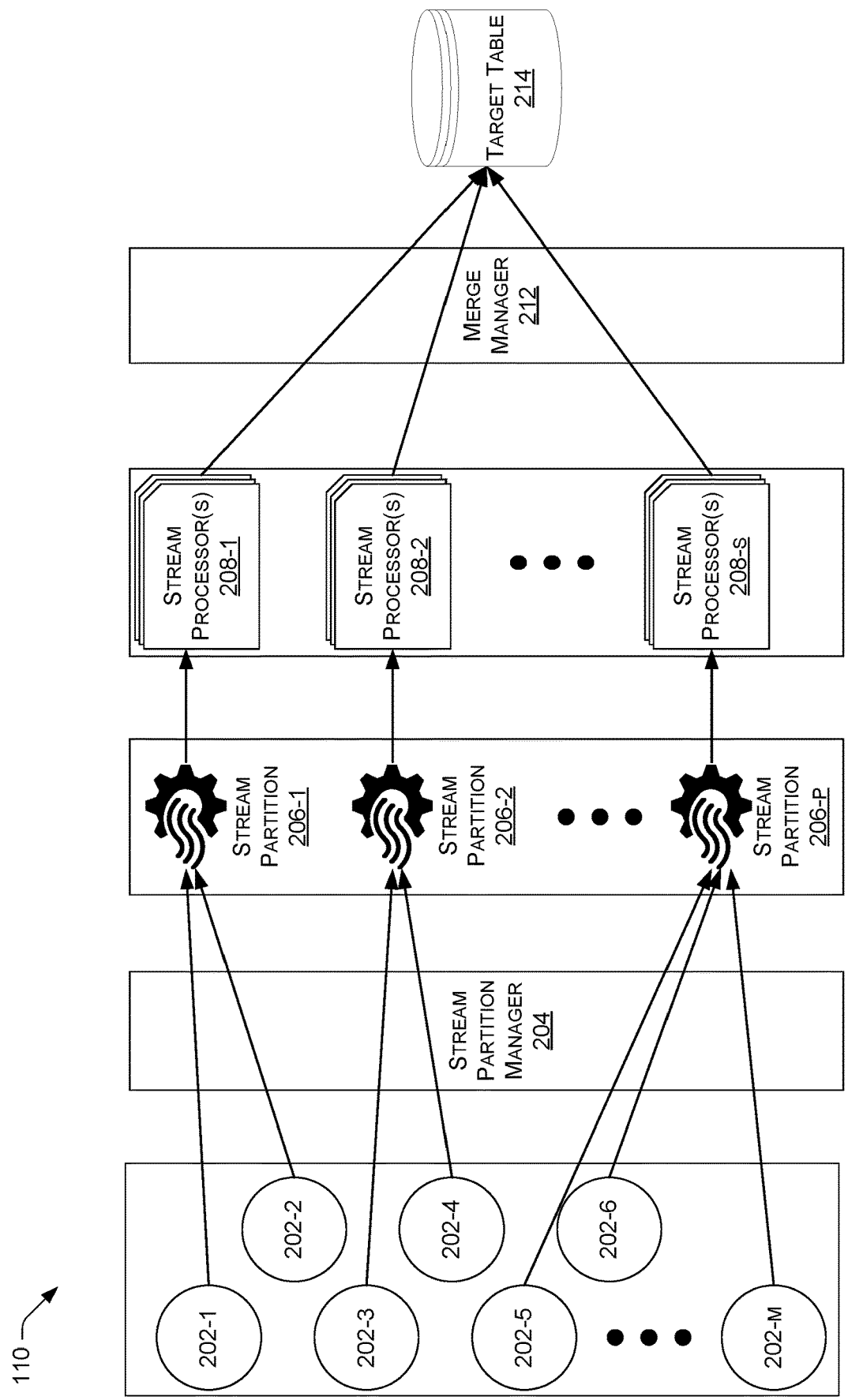
FIG. 5 is a schematic diagram of an actor-based data processing system, according to an example of the principles described herein.

FIG. 5 is a schematic diagram of an actor-based data processing system, according to an example of the principles described herein. In the example of FIG. 5, the staging tables 210 depicted in FIG. 2 are removed. In this example, the process performs in a similar manner as to the actors 202, stream partition manager 204, stream partitions 206 and stream processors 208. However, the merge manager 212 may serve to assist the stream processors 208 in queueing their respective uploads of batches to the target table 214. The stream processors 208 of FIG. 3 may transmit batches of, for example, 5,000 table entries directly to the target table 214. The merge manager 212 may employ a first-in-first-out algorithm where the stream processors 208 are served one at a time, and the stream processor 208 that has been waiting the longest is served first. In this manner, the merge manager 212 creates a queue for the stream processors 208 to upload the batches of data entries to the target table 214 in a serial manner. In this manner, performance issues that may arise with regard to the building of indexes, allocating pages, etc. within the target table 214 if multiple processes were allowed to hit the target table 214 at the same time is overcome through the use of the merge manager 212.

Once the batches are uploaded to the target table 214, they are stored as persistent data. The data stored in target table 214 is accessible for display by a user interface (UI) and/or processing by a user computing device. Thus, as data is collected, processed, and stored by the network architecture 100 and the actor-based service provider 110, an end user may view and utilize the collected data for any purpose.

Example Network Device

Figure 6:
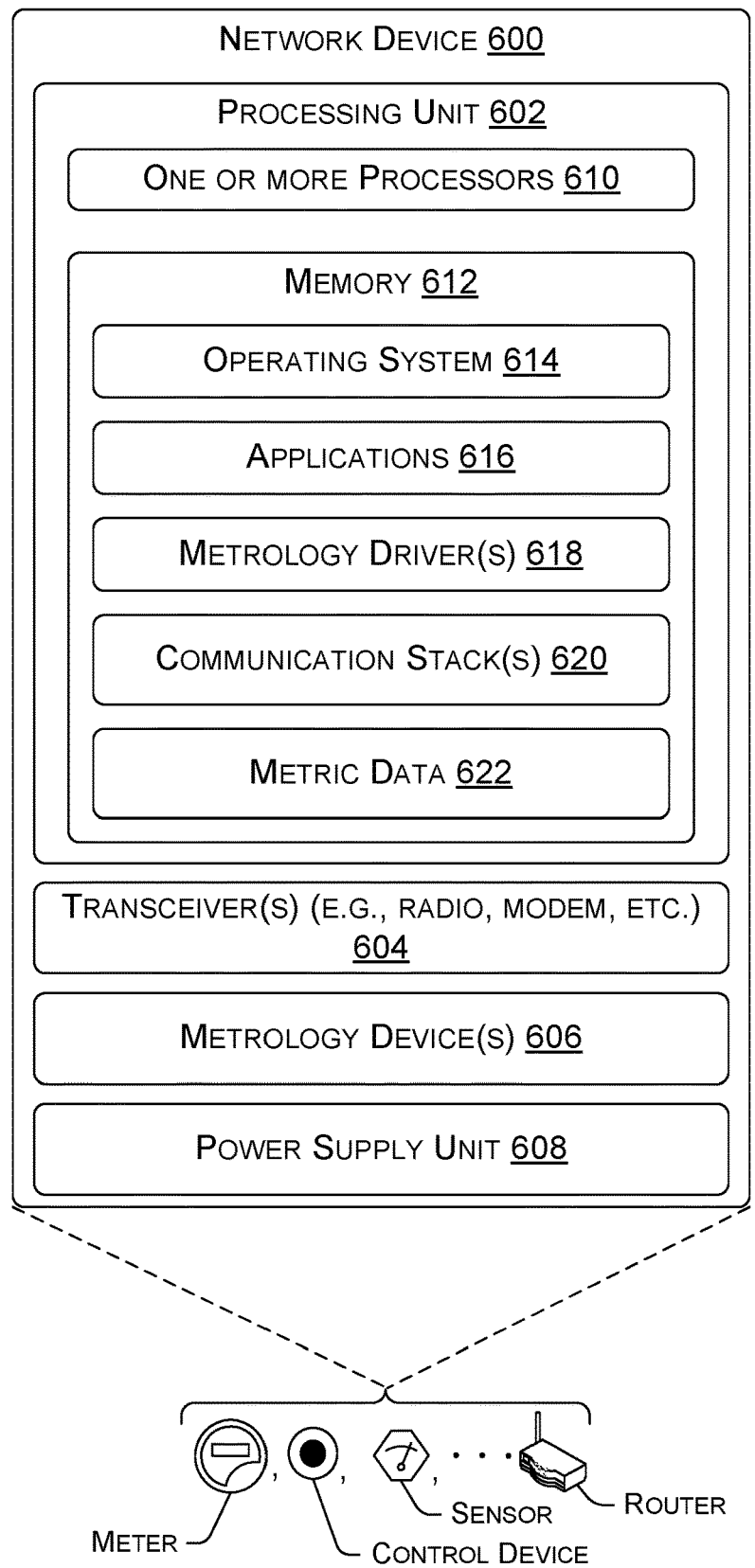
FIG. 6 is a schematic diagram of a network device, according to an example of the principles described herein.

FIG. 6 is a schematic diagram of a network device 600, such as any of the physical devices 102 or the network communication device 104. The network device 600 may include any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on.

In one example, the network device 600 includes a Full Function Device (FFD), while in other examples the network device 600 includes a Limited Function Device (LFD). An FFD may include more functionality/resources than an LFD, such as different processing powers, processing capabilities, power reliance, hardware components, etc. In one example, an FFD is implemented as a Mains Powered Device (MPD) that is connected to mains electricity (e.g., electricity meters), while an LFD is implemented as Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life. In one example, components of LFDs are lower power components than the corresponding components of the FFDs.

As depicted in FIG. 6, the example network device 600 includes a processing unit 602, a transceiver(s) 604 (e.g., radio, modem, etc.), one or more metrology devices 606, and a power supply unit 608. The processing unit 602 may include one or more processors 610 and memory 612. The one or more processors 610 may include microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 604 may include one or more hardware and/or software implemented radios to provide two-way RF communication with other network communication devices in the AN 106 and/or other devices via the network 108. The transceiver(s) 604 may additionally or alternatively include a modem to provide power line communication (PLC) communication with other network communication devices that are connected to an electrical service grid.

In one example, the transceiver(s) 604 may include different characteristics depending on the type of device implementing the transceiver(s) 604. For example, while both FFDs and LFDs have transceivers, the specific transceivers used may be different. To illustrate, an FFD transceiver may include a PLC modem while an LFD transceiver may not because the LFD is not connected to an electrical power line that could be used for PLC communications. Additionally, or alternatively, an LFD transceiver may employ a lower power RF radio to minimize energy consumption.

The metrology device(s) 606 includes physical hardware and/or sensors to measure consumption data of a resource (e.g., electricity, water, or gas) at a site of the meter. In the case of an electric meter, for example, the metrology device(s) 606 may include one or more Hall effect sensors, shunts, or the like. In the case of water and gas meters, the metrology device(s) 606 may include various flow meters, pressure sensors, or the like. The metrology device(s) 606 may report the consumption data to a service provider via the transceiver(s) 604. The consumption data may be formatted and/or packetized in a manner or protocol for transmission. Although the network device 600 includes a metrology device(s) 606 that perform the above functions, any sensor device lending the use of the network device 600 in any application is envisioned by the present systems and methods.

The power supply unit 608 may provide power to the network device 600. In one example, such as when the network device 600 is implemented as an FFD, the power supply unit 608 includes a mains power connector that couples to an Alternating Current (AC) or Direct Current (DC) mains power line where the network device 600 is installed. In one example, such as when the network device 600 is implemented as a LFD, the power supply unit 608 includes a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 612 includes an operating system (OS) 614 and one or more applications 616 that are executable by the one or more processors 610. The memory 612 may also include one or more metrology drivers 618 configured to receive, interpret, and/or otherwise process metrology data collected by the metrology device(s) 606. Additionally, or alternatively, one or more of the applications 616 may be configured to receive and/or act on data collected by the metrology device(s) 606.

The memory 612 may also include one or more communication stacks 620. In some examples, the communication stack(s) 620 may be configured to implement a 6LowPAN protocol, an 802.15.4e (TDMA CSM/CA) protocol, an 802.15.4-2015 protocol, 802.15.4g protocol, and/or another protocol. However, in other examples, other protocols may be used, depending on the networks with which the device is intended to be compatible. The communication stack(s) 620 describe the functionality and rules governing how the network device 600 interacts within the network architecture 100. For example, the communication stack(s) 620 may cause the physical devices 102, the network communication device 104, actor-based service provider 110 and other devices within the network architecture 100.

As illustrated, the memory 612 may also store metric data 622. The metric data 622 may include any characteristics, properties, states, statuses, and/or locations of the physical devices 102 (e.g., metrology devices), data related to the execution of distributed intelligence (DI) software, load disaggregation data, data related to the data collection functions of the metrology devices, metrology data, heartbeat data, event data, critical event data, data defining utility usage, data defining utility loss events (e.g., utility theft), high impedance detection (HID) event data, load disaggregation data, broken neutral event data, data defining a topology of a network within which the metrology device is included, data defining the metrology device and/or its functions, an electronic serial number associated with the metrology device, a model number of the metrology device, an operating system executed on the metrology device, software and/or firmware executed on the metrology device, advanced metering infrastructure (AMI) meter consumption data, other types of data, and combinations thereof. Further, because the systems and methods described herein may be used in any networking scenario and in association with any type of computing or electronic devices within the network, any types of data may be transmitted from the network to the actors of the actor-based service provider and provide the functionality of the present systems and methods to those types of data. The metric data 622 may be updated from time to time and transmitted to the actor-based service provider 110 to maintain data for the actors 202 to virtually represent.

In one example, the network device 600 may be configured to send or receive communications on multiple channels simultaneously. For example, the transceiver(s) 604 may be configured to receive data at the same time on hundreds of channels. Additionally, or alternatively, the transceiver(s) 604 may be configured to send data at the same time on hundreds of channels.

The network device 600 may be configured to execute a number of applications 616 to provide associated data to the actor-based service provider 110 in order to allow the functionality of the actor-based service provider 110 described in connection with FIGS. 1 through 5 including the collection and storage of data obtained from the network architecture 100.

The memory 612 of the network device 600 may include software functionality configured as one or more "modules." The modules are intended to represent example divisions of software for purposes of discussion, and they are not intended to represent any type of requirement or required method, manner, or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 612) are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network devices are described herein, it should be understood that those network devices may include other components and/or be arranged differently. As noted above, in one example a network device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

Figure 7:
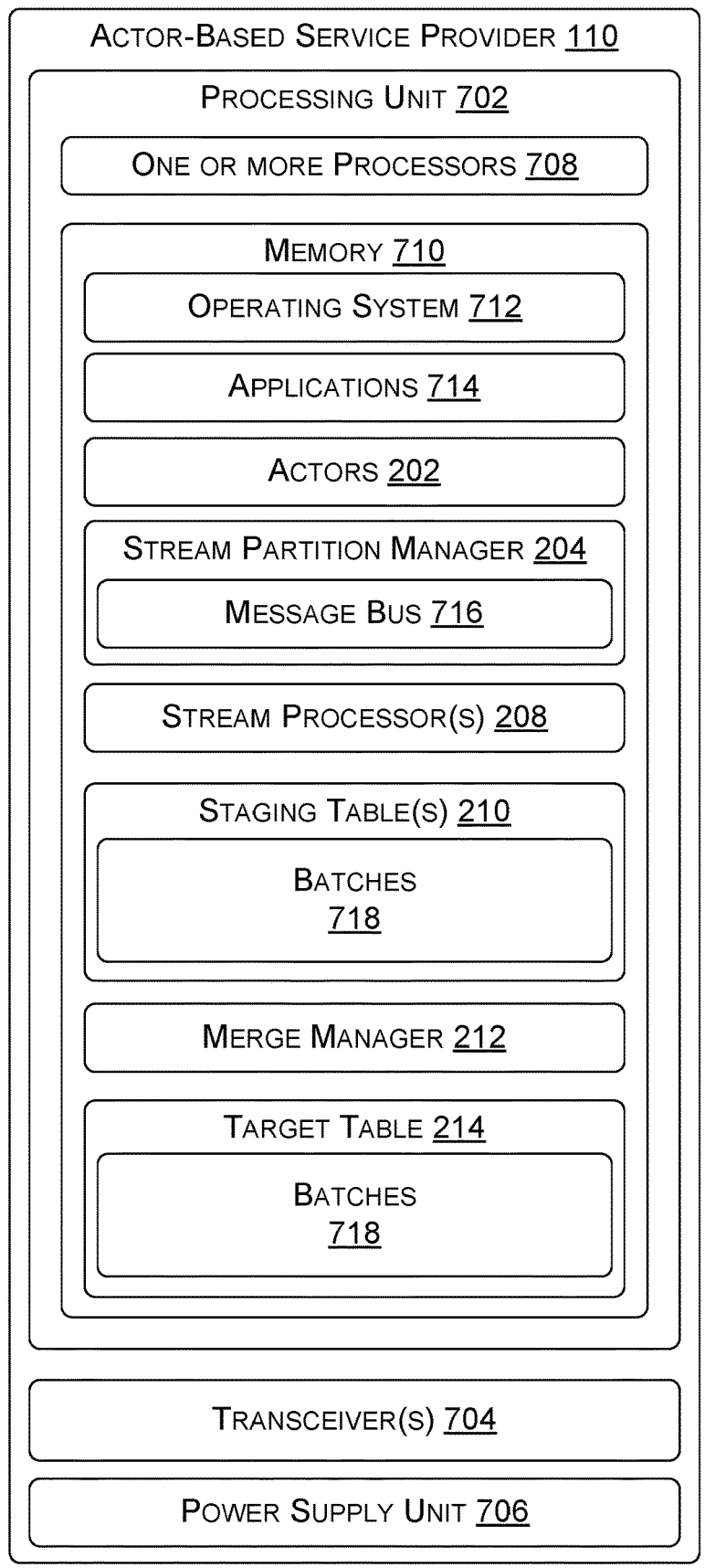
FIG. 7 is a schematic diagram of an actor-based service provider, according to an example of the principles described herein.

FIG. 7 is a schematic diagram of an actor-based service provider 110, according to an example of the principles described herein. The actor-based service provider 110 may include any type of server-implemented service that implements the systems and methods described herein. The actor-based service provider 110 may include any number of physical machines and/or virtual machines (VMs) that are supported by a number of underlying physical host computing devices. In one example, the actor-based service provider 110 may include one or more application servers (e.g., a server that hosts applications such as those executed by the actor-based service provider 110), database servers (e.g., a server that utilizes a database application to provides database services to the network architecture 100 and actors 202), communications servers, file servers, web servers, other types of server computers, and/or combinations thereof. On one example, the actor-based service provider 110 may include a number of system virtual machines and/or a number of process virtual machines to provide the functionality described herein. The actor-based service provider 110 may be implemented at a centralized location (e.g., a data collection device, central office, head end, etc.) or may be implemented using a distributed computing architecture which may include one or multiple computing devices including computing devices of one or more data collection device(s), central office(s), head end(s), data center(s), server farm(s), cloud computing resource(s), or the like.

As depicted in FIG. 7, the example actor-based service provider 110 includes a processing unit 702, a transceiver(s) 704 (e.g., radio, modem, etc.), and a power supply unit 706. The processing unit 702 may include one or more processors 708 and memory 710. The one or more processors 708 may include microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 704 may include one or more hardware and/or software implemented communication devices to provide two-way communication with other network communication devices in the AN 106 and/or other devices via the network 108. In one example, the transceiver(s) 704 may receive data from the network devices 600 (e.g., the physical devices 102). In one example, the data obtained by the physical devices 102 may be received via the transceiver(s) 704 of the actor-based service provider 110 from the physical devices 102, through a number of intermediary devices such as, for example, a connected grid router (CGR), head-end OpenWay Operations Center (OWOC), and subsequently transmitted to the actors 102 via queues in, for example, the RabbitMQ™ message-broker software.

The power supply unit 706 may provide power to the actor-based service provider 110. In one example, the power supply unit 706 may include a mains power connector that couples to an Alternating Current (AC) or Direct Current (DC) mains power line where the actor-based service provider 110 is installed. In one example, the power supply unit 706 may include a battery, such as a Lithium Thionyl Chloride battery, a Lithium Manganese battery, a Lithium Ion battery, a lead-acid battery, an alkaline battery, and so on.

The memory 710 includes an operating system (OS) 712 and one or more applications 714 that are executable by the one or more processors 708. The memory 710 may also include the plurality of actors 202 configured to receive, interpret, and/or otherwise process metrology data collected by the physical devices 102 within the network architecture 100 since the actors 202 are virtual representations of the physical devices 102. Additionally, or alternatively, one or more of the applications 714 may be configured to receive and/or act on data collected by the physical devices 102 and/or the actors 202. In one example, the applications may include any headend software suite that includes applications to assist in the collection and/or management of the data packets as described herein. As described herein, the actors 202 may store the metric data 622 obtained by the network device 600 described in connection with FIG. 6 since, again, the actors 202 are virtual representations of the network devices 600 (the physical devices 102).

In one example, the actor-based service provider 110 may be configured to send or receive communications on multiple channels simultaneously. For example, the transceiver(s) 704 may be configured to receive data at the same time on hundreds of channels. Additionally, or alternatively, the transceiver(s) 704 may be configured to send data at the same time on hundreds of channels.

The actor-based service provider 110 may be configured to execute a number of applications 714 to provide associated data to the actor-based service provider 110 in order to allow the functionality of the actor-based service provider 110 described in connection with FIGS. 1 through 5 including the collection and storage of data obtained from the network architecture 100.

The memory 710 of the actor-based service provider 110 may include software functionality configured as one or more "modules." The modules are intended to represent example divisions of software for purposes of discussion, and they are not intended to represent any type of requirement or required method, manner, or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 710) are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network devices are described herein, it should be understood that those network devices may include other components and/or be arranged differently. As noted above, in one example a network device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

The memory 710 of the actor-based service provider 110 may further include the stream partition manager 204 as described herein. The stream partition manager may utilize a message bus 716 to obtain the efficient transfer of data via the stream partitions 206, establish a connection with a number of downstream devices, ensure a recipient queue exists, and send a number of messages including the data packets of the actors 202.

The memory 710 may also include a number of stream processors 208 associated with the stream partitions 206. The stream processors 208 include a number of software-based virtual processors supported by a number of underlying multi-core processors. The stream processors 208 receive the data packets from the actors 202 via the stream partitions 206 and process the data packets to generate multiple table entries. The stream processors 208 form batches 718 of table entries for transmission to the staging tables 210.

The staging tables 210 may also be included as part of the memory 710 of the actor-based service provider 110. The staging tables 210 receive the batches from their respective stream processors 208 in preparation for sending those batches of table entries onto the target table 214 for persistent storage. The memory may also include a merge manager 212 to upload the batches 718 of data entries produced by the stream processors 208 and staged at the staging tables 210 to the target table 214 in an orchestrated manner as described herein. The batches 718 are then stored in the target table 214 based on the orchestration provided by the merge manager 212.

Example Processes

Figure 8:
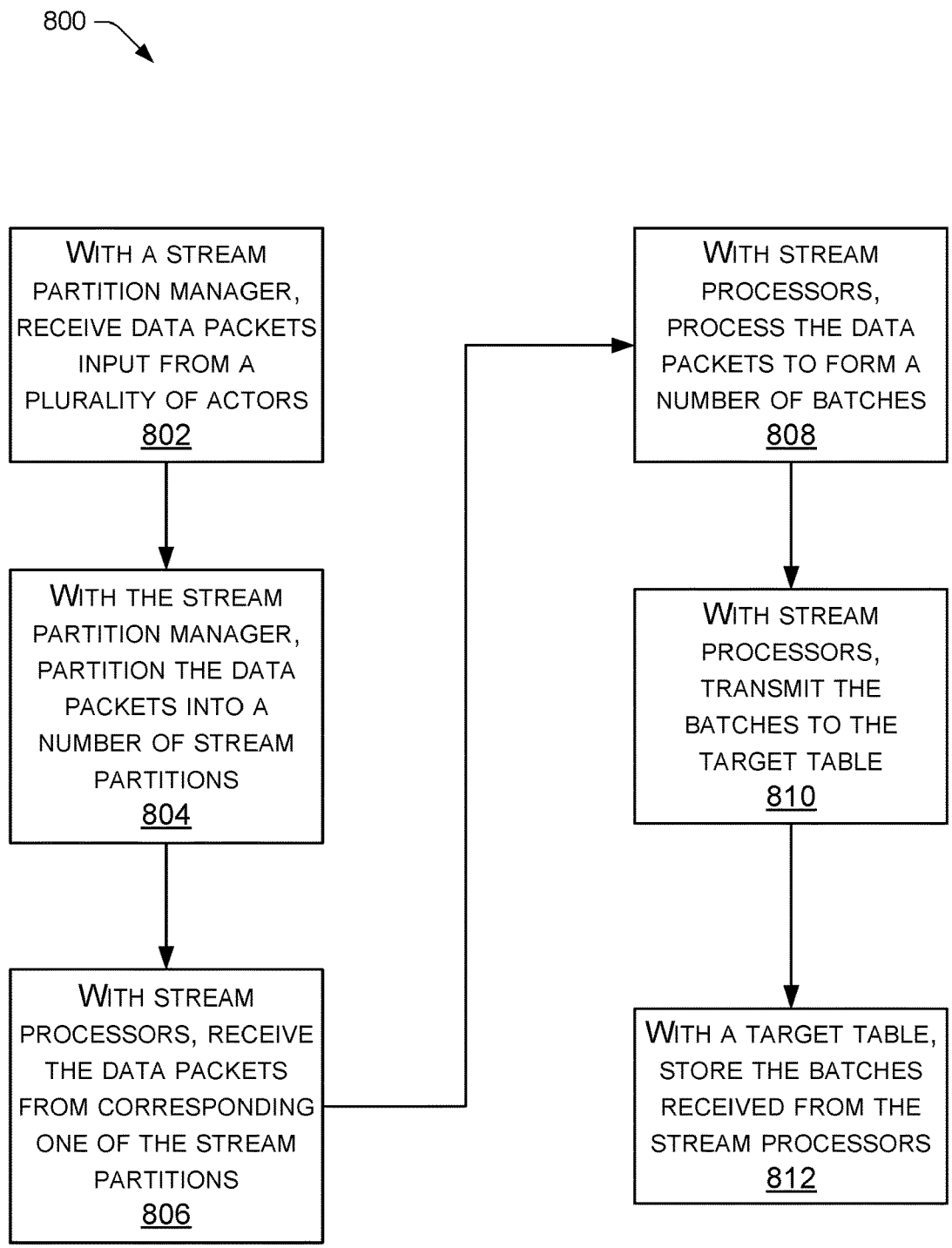
FIG. 8 illustrates a process of performing actor-based data processing, according to an example of the principles described herein.
Figure 9:
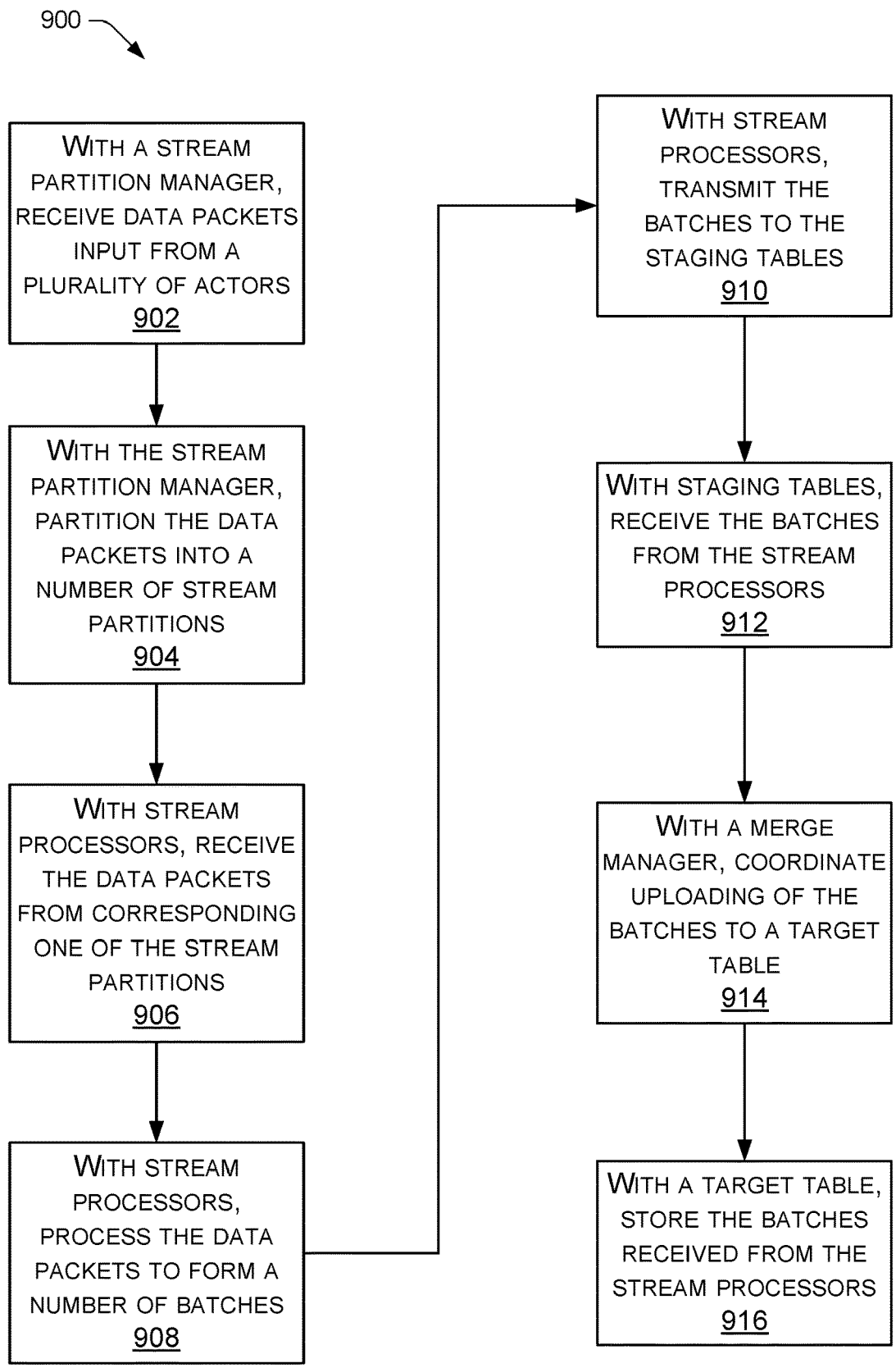
FIG. 9 illustrates a process of performing actor-based data processing, according to an example of the principles described herein.

FIGS. 8 and 9 illustrate example processes 800 and 900 for performing actor-based data processing and employing the techniques described herein. For ease of illustration the processes 800 and 900 may be described as being performed by a device described herein, such as the network device 600 and/or the actor-based service provider 110. However, the processes 800 and 900 may be performed by other devices. Moreover, the devices may be used to perform other processes.

The processes 800 and 900 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

Turning now specifically to the example process 800 illustrated in FIG. 8, FIG. 8 illustrates a process of performing actor-based data processing, according to an example of the principles described herein. The actor-based service provider 110 may, with a stream partition manager 204, receive data packets input from a plurality of actors 202 at 802. The actors 202 include virtual representations of the physical devices 102 depicted in FIG. 1. At 804, the stream partition manager 204 partitions the data packets into a number of stream partitions 206 based at least in part on one or more criteria. Further, in one example, the stream partition manager 204 assigns a stream identifier (ID) to each of the actors 202. The stream ID identifies a respective stream partition 206 to which the respective actor 202 is assigned. The actors 202 may then write data to the respective stream partitions 206 based on their respectively assigned stream IDs At 806, individual ones of a plurality of stream processors 208 communicatively coupled to the stream partitions 206 receive the data packets from a stream partition 206 of the number of stream partitions 206. The data packets are processed at 808 by the stream processors 208 to generate multiple table entries where individual data rows are collected into batches. At 810, the stream processors 208 transmit the multiple table entries in batches to a target table 214 for storage on the target table 214. Thus, the target table communicatively coupled to the plurality of stream processors 208, receives and stores the batches from individual stream processors 208 at 812.

Turning now specifically to the example process 900 illustrated in FIG. 9, FIG. 9 illustrates a process of performing actor-based data processing, according to an example of the principles described herein. The actor-based service provider 110 may, with a stream partition manager 204, receive data packets input from a plurality of actors 202 at 902. The actors 202 include virtual representations of the physical devices 102 depicted in FIG. 1. At 904, the stream partition manager 204 partitions the data packets into a number of stream partitions 206 based at least in part on one or more criteria.

At 906, individual ones of a plurality of stream processors 208 communicatively coupled to the stream partitions 206 receive the data packets from a stream partition 206 of the number of stream partitions 206. The data packets are processed at 908 by the stream processors 208 to generate multiple table entries. At 910, the stream processors 208 transmit the multiple table entries in batches to a plurality of staging tables 210.

At 912, the batches from the individual stream processors 208 are received by the staging tables 210. Individual staging tables 210 are provided for the number of stream partitions 206 included within the actor-based service provider 110. At 914, a merge manager 212 interposed between the plurality of staging tables 210 and the target table 214 coordinates uploading of the batches from individual staging tables 210 to the target table 214 for storage on the target table 214. Thus, the target table 214 communicatively coupled to the plurality of staging tables 210, receives and stores the batches from individual staging tables 210 at 916.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a stream partition manager to:
      receive data packets input from a plurality of actors, the actors comprising virtual representations of physical devices;
      partition the data packets into a number of stream partitions based at least in part on one or more criteria; and
      assign a stream identifier (ID) to each actor of the plurality of actors, the stream ID identifying a respective one of a number of stream partitions to which the respective actor is assigned;
   a plurality of stream processors communicatively coupled to the stream partition manager, individual stream processors of the plurality of stream processors to:
      receive data packets from a stream partition of the number of stream partitions;
      process the data packets to generate multiple table entries; and
      transmit the multiple table entries in batches; and
   a target table communicatively coupled to the plurality of stream processors, the target table to receive and store the batches received from the individual stream processors,
   wherein each actor of the plurality of actors writes data to the respective one of the stream partitions based on their respectively assigned stream IDs.

2. The system of claim 1, further comprising a plurality of staging tables interposed between the plurality of stream processors and the target table to receive the batches from the individual stream processors prior to transmission to the target table, wherein individual staging tables are provided for the number of stream partitions.

3. The system of claim 2, further comprising a merge manager interposed between the plurality of staging tables and the target table to coordinate uploading of the batches from individual staging tables of the plurality of staging tables to the target table.

4. The system of claim 2, wherein the plurality of staging tables and the target table include a same database schema.

5. The system of claim 2, wherein the plurality of staging tables are updated in first batches at a first frequency and the target table is updated in second batches at a second frequency, the second frequency being different than the first frequency.

6. The system of claim 1, wherein the target table is a first target table and is associated with a first application running on at least some of the plurality of actors, the system further comprising a second target table associated with a second application running on at least some of the plurality of actors, the second application being different than the first application.

7. The system of claim 1, wherein the physical devices comprise metrology devices.

8. A method comprising:
   with a stream partition manager:
      receiving data packets input from a plurality of actors, the actors comprising virtual representations of physical devices;
      partitioning the data packets into a number of stream partitions based at least in part on one or more criteria; and
      assigning a stream identifier (ID) to each actor of the plurality of actors, the stream ID identifying a respective stream partition to which a respective actor of the plurality of actors is assigned;
   with individual ones of a plurality of stream processors communicatively coupled to the stream partitions:
      receiving the data packets from a stream partition of the number of stream partitions;
      processing the data packets to generate multiple table entries; and
      transmitting the multiple table entries in batches;
   with a plurality of staging tables, receiving the batches from the individual ones of the plurality of stream processors, wherein individual ones of the plurality of staging tables are provided for the number of stream partitions; and
   with a target table communicatively coupled to the plurality of staging tables, receiving and storing the batches from individual staging tables of the plurality of staging tables,
   wherein each respective actor writes data to the respective stream partition associated with the stream ID assigned to the respective actor.

9. The method of claim 8, further comprising, with a merge manager interposed between the plurality of staging tables and the target table, coordinating uploading of the batches from the plurality of staging tables to the target table.

10. The method of claim 8, wherein the plurality of staging tables and the target table include a same database schema.

11. The method of claim 10, wherein the physical devices comprise metrology devices.

12. The method of claim 8, wherein the target table includes:
- a first target table associated with a first application running on at least some of the plurality of actors; and
- a second target table associated with a second application running on at least some of the plurality of actors, the second application being different than the first application.

13. The method of claim 8, wherein the plurality of staging tables are updated in first batches at a first frequency and the target table is updated in second batches at a second frequency, the second frequency being different than the first frequency.

14. A non-transitory computer-readable medium storing instructions that, when executed, causes a processor to perform operations, comprising:
- with a stream partition manager:
  - receiving data packets input from a plurality of actors, the actors comprising virtual representations of physical devices;
  - partitioning the data packets into a number of stream partitions based at least in part on one or more criteria; and
  - assigning a stream identifier (ID) to each actor of the plurality of actors, the stream ID identifying a respective one of a number of stream partitions to which the respective actor is assigned;
- with individual ones of a plurality of stream processors communicatively coupled to the stream partitions:
  - receiving the data packets from a stream partition of the number of stream partitions;
  - processing the data packets to generate multiple table entries; and
  - transmitting the multiple table entries in batches;
- with a merge manager:
  - receiving the batches from the stream processors; and
  - coordinating uploading of the batches; and
- with a target table communicatively coupled to the merge manager, receiving and storing the batches received from individual stream processors of the plurality of stream processors, wherein each actor of the plurality of actors writes data to the respective one of the stream partitions based on their respectively assigned stream IDs.

15. The computer-readable medium of claim 14, wherein the operations further comprise, with a plurality of staging tables interposed between the plurality of stream processors and the target table, receiving the batches from the individual stream processors prior to transmission to the target table, wherein individual staging tables are provided for the number of stream partitions.

16. The computer-readable medium of claim 15, wherein the plurality of staging tables and the target table include a same database schema.

17. The computer-readable medium of claim 15, wherein the plurality of staging tables are updated in first batches at a first frequency and the target table is updated in second batches at a second frequency, the second frequency being different than the first frequency.

18. The computer-readable medium of claim 14, wherein the target table includes:
- a first target table associated with a first application running on at least some of the plurality of actors; and
- a second target table associated with a second application running on at least some of the plurality of actors, the second application being different than the first application.

19. The computer-readable medium of claim 14, wherein the physical devices comprise metrology devices.

* * * * *